Feb. 18, 1947.   W. T. MARCHMENT   2,416,059
ELECTRICAL APPARATUS FOR INDICATING LIQUID LEVELS
Filed Sept. 27, 1943   7 Sheets-Sheet 1

Feb. 18, 1947. W. T. MARCHMENT 2,416,059
ELECTRICAL APPARATUS FOR INDICATING LIQUID LEVELS
Filed Sept. 27, 1943 7 Sheets-Sheet 2

Feb. 18, 1947.   W. T. MARCHMENT   2,416,059
ELECTRICAL APPARATUS FOR INDICATING LIQUID LEVELS
Filed Sept. 27, 1943   7 Sheets-Sheet 3

Inventor
William Thomas Marchment
By Ralph B. Stewart
Attorney

Feb. 18, 1947.   W. T. MARCHMENT   2,416,059
ELECTRICAL APPARATUS FOR INDICATING LIQUID LEVELS
Filed Sept. 27, 1943   7 Sheets-Sheet 7

FIG. 16.

Inventor
William Thomas Marchment
By Ralph B. Stewart
Attorney

Patented Feb. 18, 1947

2,416,059

UNITED STATES PATENT OFFICE 2,416,059

ELECTRICAL APPARATUS FOR INDICATING LIQUID LEVELS

William Thomas Marchment, Chiswick, London, England, assignor to Evershed and Vignoles Limited, London, England, a British company Application September 27, 1943, Serial No. 504,013
In Great Britain October 24, 1942

5 Claims. (Cl. 201—56)

This invention relates to electrically-controlled liquid level gauges or apparatus for indicating the surface level of liquid, for example, in liquid fuel tanks, and in particular the petrol tanks of aircraft.

Liquid level gauges for use on aircraft present peculiar problems which do not arise in gauges for use on stationary apparatus. Peculiar conditions arise from the evolutions which aircraft have to carry out in flight and from engine vibration, as well as the varying impacts of air currents on the plane surfaces and so forth. It, therefore, follows that forms of mechanical and electrical gauges involving the use of floats which may be satisfactory for use on stationary apparatus are apt to fail utterly on a moving vehicle due to the inertia of the floats and of the arms and other moving parts connected with the floats when such parts are used.

A liquid level gauge is set forth in the specification of my Patent No. 2,260,913 which overcomes these difficulties, but in that case an operation by the pilot of an aircraft or other attendant to cause movement of the float to complete an electrical circuit when it is desired to take an observation of the liquid level at any time, is necessary. It is easily appreciated that aircraft pilots have enough matters to supervise without any unnecessary operations so that a continuously reading instrument which requires no particular operation is of considerable value. In the case of liquid level gauges, this requirement in general introduces a difficulty owing to the undesirable effects of friction on a float which is designed to be sensitive to changes in liquid level and which is designed not to be affected by inertia of moving parts.

The object of the present invention is to overcome difficulties due to friction while supporting the float in a satisfactory manner in spite of engine vibration and other disturbances, and at the same time avoiding the necessity of the attendant having to make a definite operation on each occasion when it is desired to take an observation. To this end, according to the invention, a float in the form of a solid of revolution and conveniently of cylindrical form, or having part of its surface cylindrical, is encircled by one or more flexible guide members such as wires, strips or light chains which are wrapped around the float and anchored so that as the float rises or falls on change of level of the liquid surface, it rolls along the flexible member or members, the upper portions of which coil around the float and the lower portions uncoil from the float, or vice versa.

In a simple form of the apparatus, the float is a light cylindrical body encircled by a pair of thin wires of a metal which is not corroded by the liquid in the vessel. In the case of a petrol level indicator, thin steel piano wire is found to be quite satisfactory for the purpose, although other wires which will grip the float and not be unduly stiff, such as thin phosphor bronze wire, may be used with satisfactory results. The flexible members may be used as resistances themselves, but it is preferred that they should make contact through the float with separate resistance elements conveniently consisting of coiled resistance wire wound around supporting rods. This wire may be enamelled wire with its turns wound in contact, the enamel being removed along the line of contact with the float. Thus, the float is of conducting material, or has the part of its surface bearing against the resistance of conducting material.

In one form of the novel instrument, two resistance elements are mounted side by side so as to extend from the bottom to the top of the liquid vessel. The float has two conducting portions on its surface insulated from one another and maintained respectively in contact with the two parallel resistance wires by the effect of the tension in the flexible members. The float may in fact consist of two thin metal spinnings connected together by a central annular portion of insulating material making a liquid-tight joint with the end metal portions. The rods carrying the resistance wire or wires may be slightly curved to conform to the curve assumed by the flexible members so that the pressure between the float and the resistance wires is maintained substantially constant over the greater part of the travel of the float. The float is likely to be pinched against the resistances at its extreme positions where it approaches the anchorings for the flexible members, and there the resistance elements may be sloped away from the flexible members to allow for this.

In a simple form of the instrument, a single resistance element may be used in conjunction with an ohmmeter instrument of the ratiometer type and having one of its coils connected in series with the part of the resistance to one side of the float and the other coil, for example, constantly energised by connecting it across a source of supply. However, by providing two or more resistance elements in conjunction with a multi-coil form of measuring instrument with a permanent magnet moving system, the instrument can be arranged to deflect up to 360° and may then be provided with a correspondingly long scale.

In order that the invention may be clearly understood and readily carried into effect, some forms of the novel liquid level gauge will now be described by way of example with reference to the accompanying drawings, in which:

Figure 8 is a circuit diagram of a simple form of instrument in which a single resistance element is employed; while

Figure 1:
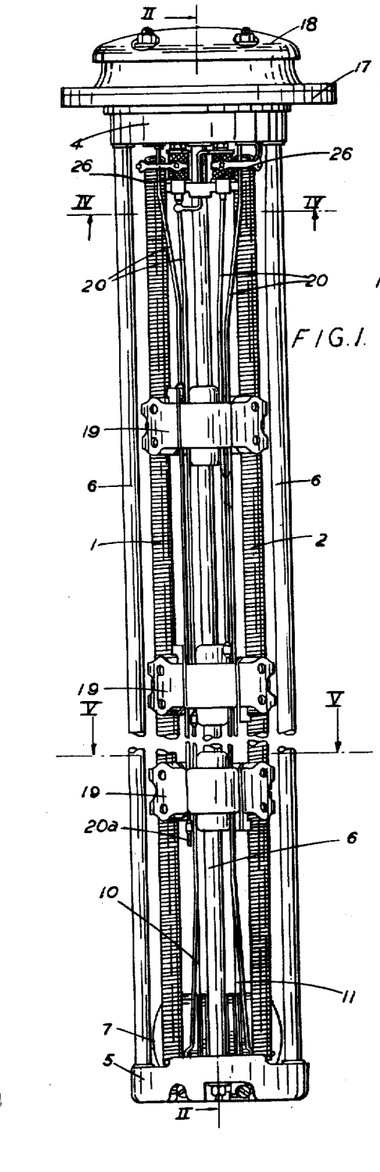
Figure 1 is a side elevation of the complete self-contained unit, with enclosing casing omitted, suitable for insertion in a petrol tank in the wing of an aircraft, for example.
Figure 2:
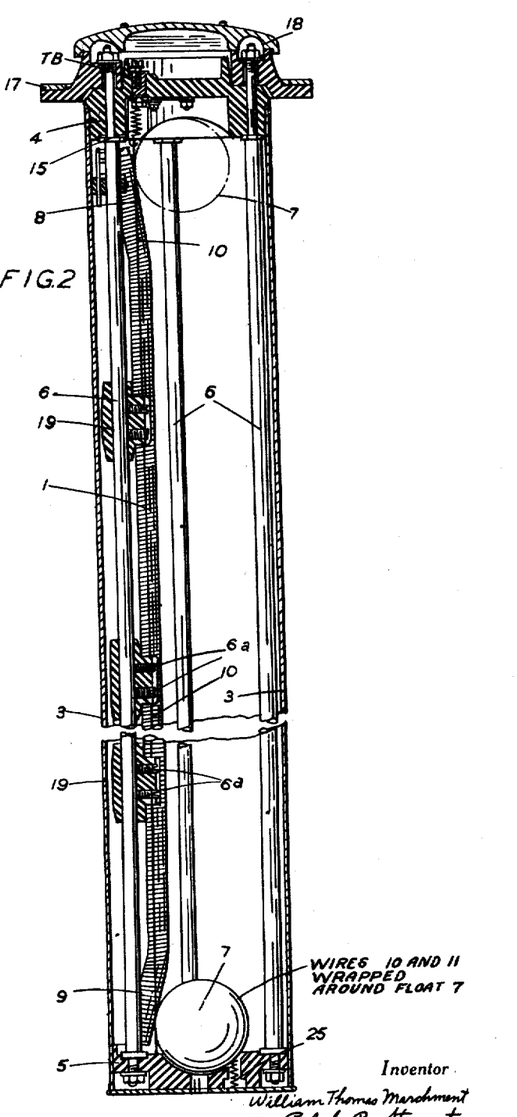
Figure 2 is a central section on the line II—II in Figure 1.
Figures 7, 9:
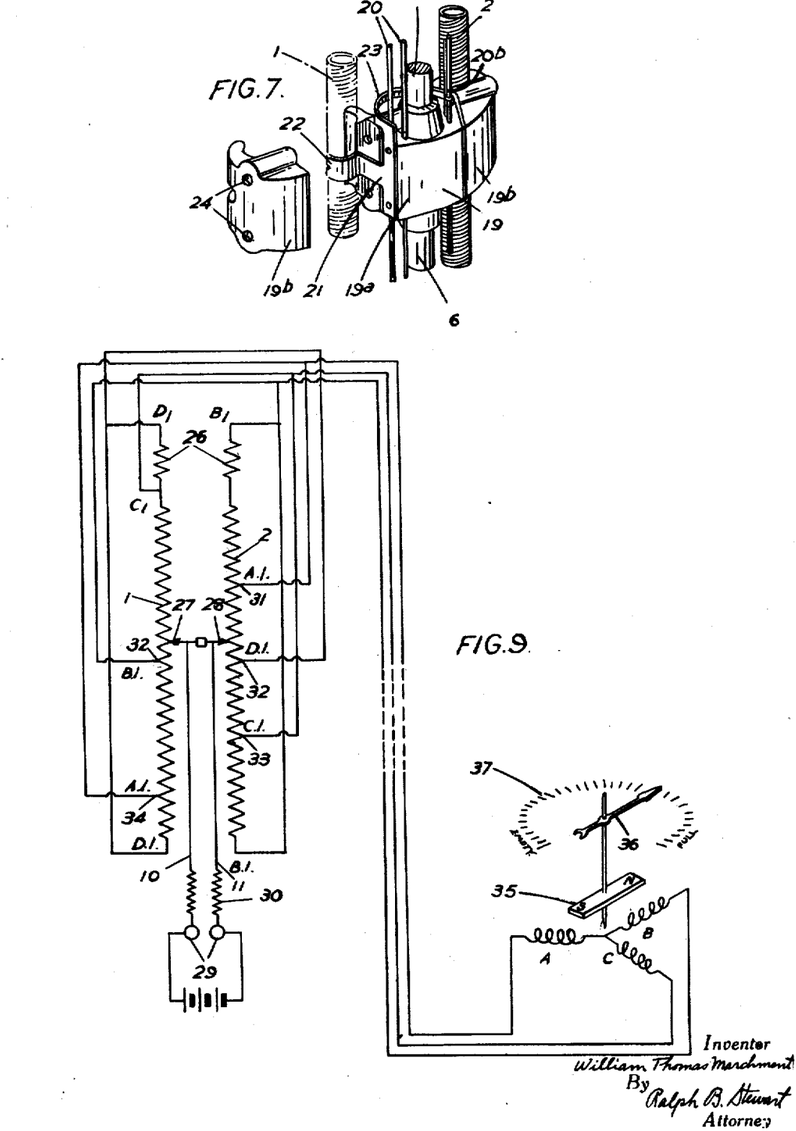
Figure 7 is a perspective view of a contact-making clamp employed, showing one end portion displaced.
Figure 9 is a similar circuit diagram of the instrument shown in Figures 1 to 7 connected to a multi-coil long scale measuring instrument.

Referring to Figures 1, 2 and 9 in particular, two resistor elements 1, 2 are provided, mounted in a casing 3 provided with top and bottom caps 4 and 5, spaced apart and stiffened by connecting tubes 6. The unit is of such a length as to extend between the highest and lowest surface levels to be indicated. Each resistor element 1, 2 is of enamel wire wound helically with its convolutions in contact along a rod of rigid insulating material or metal encased in insulating material. The enamel is removed along the line at which the float 7 is to make contact with the resistance wire. As can be seen from Figure 2, each of the resistor elements 1, 2 is straight for the greater part of its length, but at the top and bottom ends it is sloped away as seen at 8 and 9, the object of which, as will be appreciated later, is to prevent the float being pinched too heavily against the resistance wire, or, in other words, to prevent the flexible members 10, 11 from being damaged by being stressed too heavily when the float reaches either of the extreme positions illustrated in Figure 2.

Figure 5:
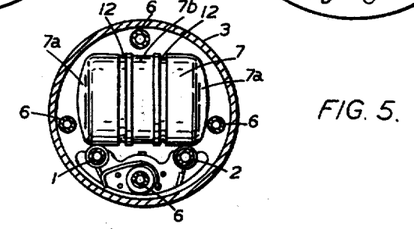
Figure 5 is a similar cross-section on the line V—V in Figure 1, looking downwards.
Figure 6:
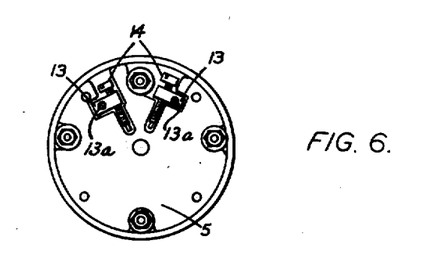
Figure 6 is a plan of the unit seen from below.

The construction of the float 7 is best seen perhaps in Figure 5. It consists of end sections 7a consisting of spinnings of thin sheet metal united by liquid-tight joints to a central annular portion 7b of insulating material so as to form a complete hollow float substantially of cylindrical form. Each of the end sections 7a, near to the edge at which it joins the central section 7b, is formed with an annular groove 12 encircling the cylindrical surface and serving as guides or tracks for the flexible members 10, 11. In the example illustrated, the flexible members 10, 11 consist of a pair of thin steel piano wires of No. 33 S. W. G., which is sufficiently strong to maintain the light float 7 in position, and is sufficiently flexible and elastic to hold the float in contact with the elements 1 and 2. The wires 10, 11 are connected at their lower ends to a pair of tension adjusting screws 14 mounted in bottom cap 5. These screws are clamped in adjusted position by blocks 13 which are clamped by screws 13a having threaded engagement with base 5. At the upper end, each wire is anchored in the upper cap 4, which may be of insulating plastic material, and the tension in the wire is maintained by a coiled tension spring 15 hooked to the upper end of the wire and secured to the anchoring screw 16. As can be seen from Figure 2, each wire 10 or 11 encircles or is wrapped round the float 7 lying in one of the grooves 12, and as a result the float 7 is at all parts of its travel pressed with one of its end sections 7a into contact with one of the resistor elements 1, 2. By this arrangement, engine or other vibration does not cause upward and downward movement of the float, but raising or lowering of the liquid surface causes the float to follow, which it does by rolling up or down the wires 10, 11 without any appreciable friction.

Figure 3:
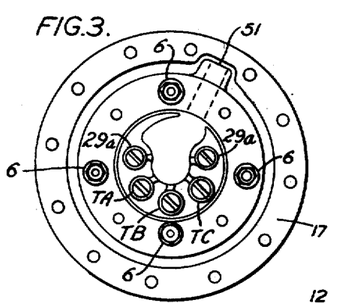
Figure 3 is a plan of the unit with the top cover removed.
Figure 4:
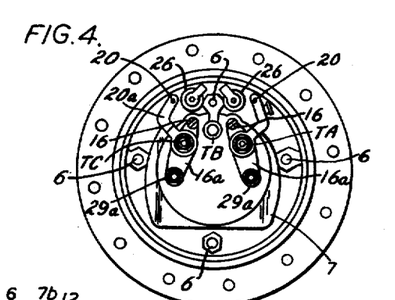
Figure 4 is a horizontal cross-section on the line IV—IV in Figure 1, looking upwards.

The whole unit is fixed in the tank by a rubber ring 17 having the cap 4 and itself surmounted by a cover 18 which may be of moulded plastic. The cap 4 also serves as a connection box, as shown in the plan view of Figure 3, in which the cover 18 is shown removed. The terminals 29a are the direct current supply terminals and the terminals TA, TB and TC are for the connections to the measuring instruments; these terminals also appear in Figure 9 which will be described below. The five-cored cable proceeding to these terminals is taken in through a lateral inlet shown at 51. The terminals 29a, TA, TB and TC can also be seen from Figure 4, which shows the underneath of the cap 4 seen from below. The anchoring screws 16 for the upper ends of the wires 10 are also seen in Figure 4 at the upper ends of strips 16a. To prevent turning of these strips, they have holes threaded over terminals 29a, TA and 29a, TC but these four terminals and the terminal TB are insulated by insulating bushings, not shown. The connections necessary will be described later in connection with the circuit diagram, but it is desirable to explain here that tappings have to be made to the resistor elements 1, 2 at four intermediate points by means of clamps 19 in addition to the connections at the top and bottom of the elements. For convenience, these tapping connections are made by means of stout wires or thin rods 20 seen particularly in Figure 1 and which extend down from the top connection box as far as is necessary for making the required connections. It will be noted, for example, that one of these rods 20 serving as connection bus-bars, terminates at the lowest clamp 19, its lower end being visible at the point 20a. The electrical connection made by these rods will be described later, but for clearness it is explained here that the clamps 19 are used for making connection at the different levels between the resistor elements 1, 2, and the appropriate bus-bar. This is seen most clearly in Figure 7, where one clamp 19 is shown consisting of a central block 19a of insulating material, and two detachable end caps 19b of the same material. The left-hand cap is shown detached to make it clear how a tapping connection is made from the resistor element 1 to one particular rod 20b constituting one of the bus-bars. The central member 19a surrounds and is fixed to one of the stiffening rods 6 by set screws 6a. A contact plate 21 is fixed to the left-hand surface of the block 19a or, if contact has also to be made at this level to the resistor element 2, a similar contact plate is fixed by screws to the right-hand face of the block 19a. The contact plate 21 of springy sheet metal has a vertical member, as shown, lying in contact with the block 19a, and a horizontal contact arm 22 which is curved into contact with the resistor element 1. At the top the plate 21 has a curved arm 23 curved to avoid the rods 20 with which it does not require to make contact, but at its free end curled around and secured to the particular rod 20b with which it makes contact. Then, when the left-hand end cap 19b is placed in position and secured to the block 19 by screws passing through holes 24, an effective and permanent contact is made at this level between the resistor element 1 and the bus-bar 20b.

As a matter of detail, in the bottom cap 5 there is a small spring 25 housed to serve as a bumper or cushion for the float in its lowermost position. On the other hand, below the upper cap 4, a pair of resistance bobbins 26 are mounted. These are connected respectively in series with the resistor elements 1 and 2, and in effect form upward continuations of those elements over which the float does not travel. The purpose of these resistances 26 will now be explained in connection with a description of the circuit, and it is in fact concerned with the fact that the scale of the measuring instrument used extends over about 300° since, if the scale extended over the full 360°, the full and empty positions would coincide and lead to confusion. Now, therefore, referring to Figure 9, the resistor elements 1, 2 are shown diagrammatically and the resistances 26, each of which may have a resistance of one-fifth of either the resistances 1 or 2, are shown in series respectively with those resistances. The contacts made by the sections 7a of the float are shown at 27 and 28 and are connected actually through the flexible members 10, 11 to a source of supply 29 which may be the aircraft battery, safety resistances 30 being connected in each lead. The tapping connections to intermediate points in the resistor elements 1, 2 made by the contact springs 22 at the clamps 19, are shown at points 31, 32, 33, 34, which are at heights corresponding to the four clamps 19 three of which appear in Figures 1 and 2. They actually subdivide the resistance elements 1 and 2 as follows: In the element 1, two fifths of the resistance is above the tapping 32, two fifths between the tappings 32 and 34 and one fifth below the tapping 34 while in the element 2, one fifth of the resistance is above the tapping 31, one fifth between the tappings 31 and 32, one fifth between the tappings 32 and 33 and two fifths below the tapping 33. Then each of the bobbins 26 has a resistance equal to one fifth of that of either of the elements 1, 2.

The measuring instrument employed has three stationary coils A, B, C, spaced 120° apart, and a moving system comprising a permanent magnet 35 and a pointer 36 working over a scale 37. In Figure 9, the tapping points in the resistance elements 1, 2, and the resistances 26 connected respectively to the outer ends of the coils A, B, C, are indicated by the reference letters $A_1$, $B_1$, and $C_1$, while it will be seen that the three points $D_1$ are merely connected together without any external connection. The resistances 1, 2 and 26 connected in this way form the equivalent of a complete double ring or toroid winding so that as the float contacts 27, 28 move from one end to the other, the resultant field due to the coils A, B, C is gradually shifted through about 300°, although if the resistances 26 were actual parts of the resistances 1 and 2 and the float could make contact with them, the field would move through a complete 360°.

In order to make this action clear, the diagrams shown in Figures 10 to 16 illustrate the position taken up by the permanent magnet 35 in each of the positions of the float contacts 27, 28 as it moves step-by-step from one tapping point to another in the resistances 1, 2, while in this case, to show the possibility of a complete revolution of the moving system, the resistances 26 are assumed to be actual continuations of the resistances 1 and 2. The same reference numerals are employed as in Figure 9, and it will be seen in Figure 10 that the float contacts 27, 28 are at the lower ends of the resistances so that the current path from the source of supply 29 is to the float contact 27, where the path divides into two circuits, one through the section of resistance 1 from the point $D_1$ to $A_1$, and then through the conductors 38, 39 to the fixed coil A. The other circuit is through conductor 40, conductor 41, resistance 26, and conductors 42 and 43 to the coil C, the two currents uniting and passing through the coil B by conductor 44 back to the supply 29. The same resistance is in each of the divided branches of the current path so that the coils A, C carry the same currents and the resultant field in the measuring instrument is along the axis of the coil B so that the permanent magnet 35 sets itself as in Figure 10.

Figure 11:
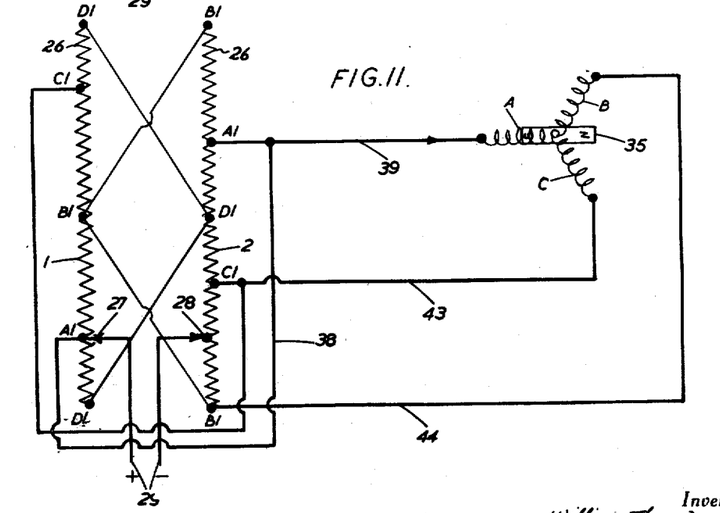
Figure 12:
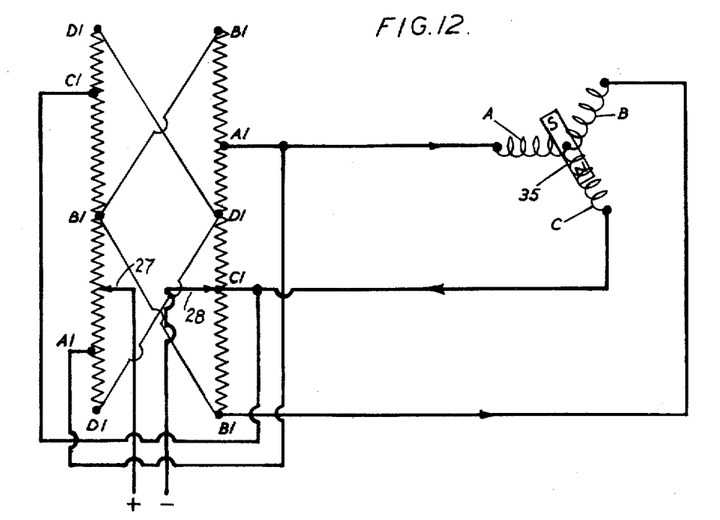
Figure 13:
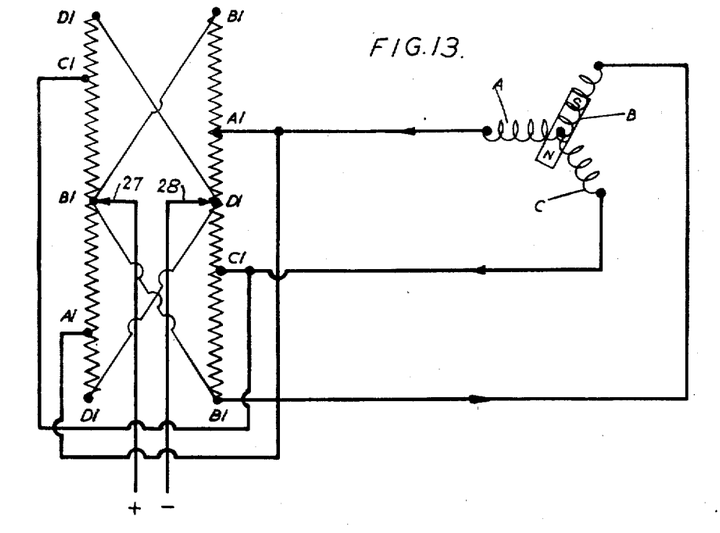
Figure 14:
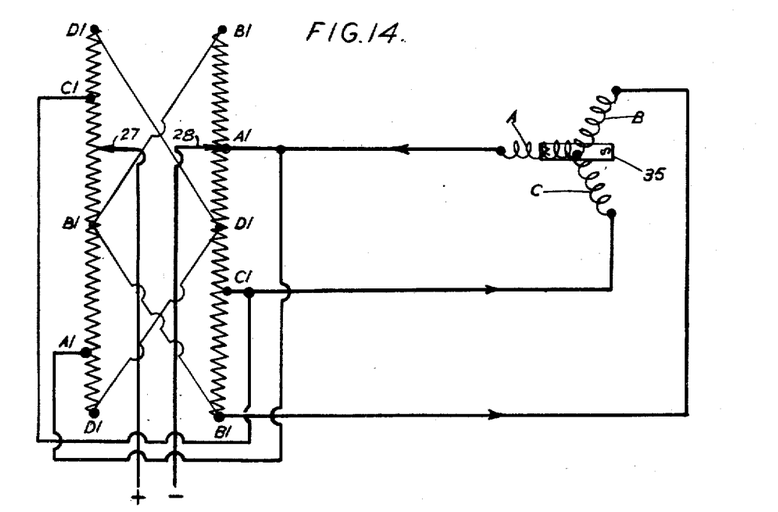
Figure 15:
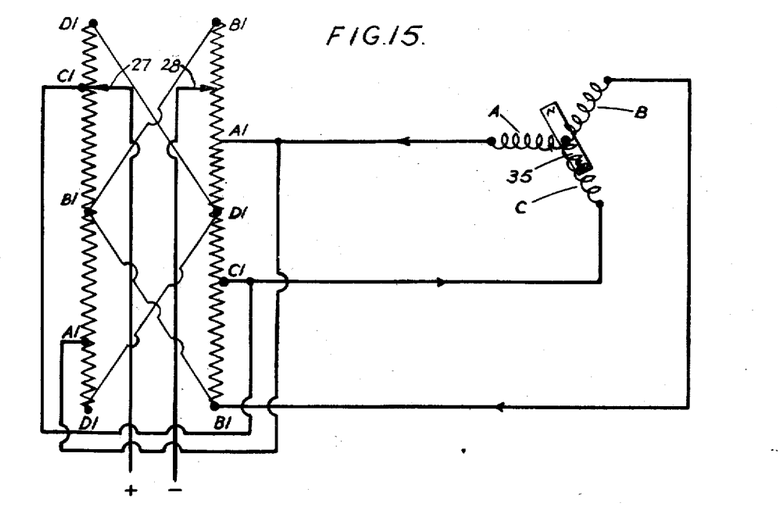

In Figure 11, the float contacts 27, 28 have moved up one step so that now the circuit is from the source 29 to float contact 27, through conductors 38 and 39, and through the fixed coil A entering at the outer end; the current then splits off, passing through coil C and conductor 43, and through the resistance section from the point $C_1$ to the float contact 28, whereas the other half of the current passes through coil B and conductor 44, and the section of resistance 2 from $B_1$ to the float contact 28 in Figure 11. The field in the measuring instrument is therefore now along the axis of coil A with the current entering at the outer end so that the permanent magnet 35 has moved through 60° bi-secting the line between the axis of the coils B and C.

Figure 10:
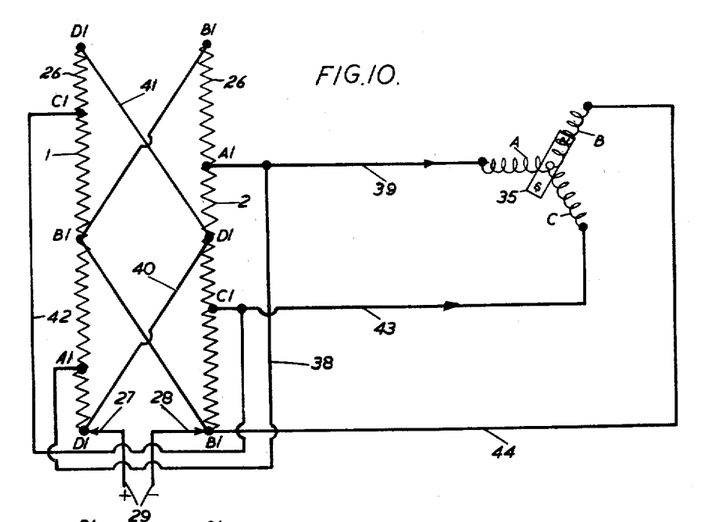
Figures 10 to 16 are explanatory circuit diagrams corresponding to different heights of the float for explaining the operation of the instrument connected as shown in Figure 9.
Figure 16:
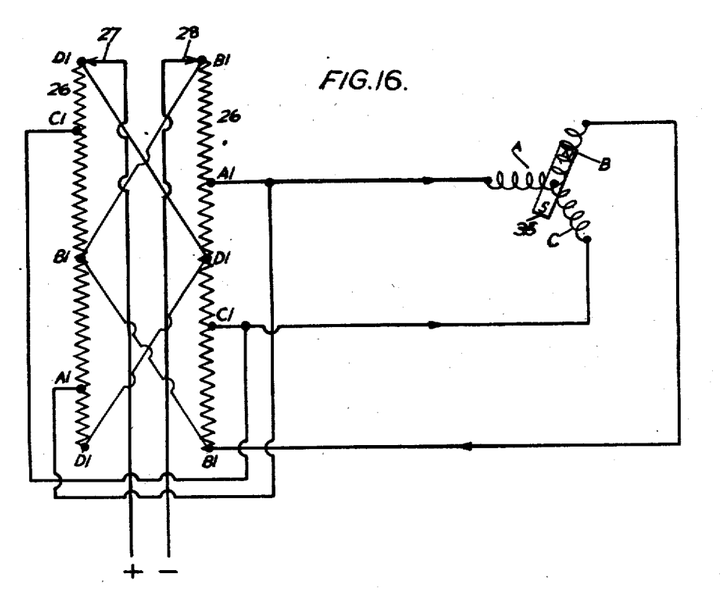

By tracing the circuits in a similar way in Figures 12, 13, 14, 15 and 16, it will be seen that at each upward stage of movement of the float contacts 27, 28, the permanent magnet 35 turns through 60° at each step until in Figure 16 with the float contacts 27, 28 at the top of the resistances 26, the moving system has returned to the position shown in Figure 10. If the resistances 26 are separate resistances and are not traversed by the float contacts as in Figure 9, it will be observed that when the float reaches the top of the resistance elements 1, 2, the moving system takes up the position shown for the magnet 35 in Figure 15, that is to say, the full scale deflection is through 300°.

The measuring instrument may be provided with a zero biasing coil arranged so that if the float contact circuits are interrupted, the magnet 35 is caused to take up a position with the pointer 36 on the scale mid-way between the full and empty positions so as to give an indication that the circuit is out of commission.

Figure 8:
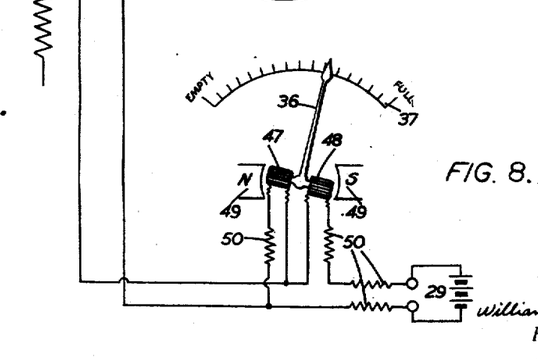

In Figure 8, a simplified arrangement is shown diagrammatically with a single resistance element 45 and a single float contact 46. The instrument employed is of the ordinary ratiometer type, with a pair of coils 47, 48, fixed back to back so as to move in a graduated magnetic field provided by the permanent magnets 49. As shown, the part of the resistance 45 above the float contact 46 is connected to the source of supply 29 in series with the moving coil 48, while the other moving coil 47 is connected substantially across the source of supply 29 and is constantly excited. The usual safety resistances 50 are provided so that when the tank is full and the resistance in circuit with the coil 48 is a minimum, the pointer 36 is moved to the right-hand end of the scale 37 indicating that the tank is full.

In each of the forms of construction illustrated and referred to, a pair of flexible guide members are provided to encircle the float; but clearly it is possible, particularly in the case of an instrument with twin resistors, to employ a single guide wire and to arrange for the float to roll along conductor rails which are utilised for connecting the positive and negative sides of the source of supply to the float.

I claim:

1. An apparatus for indicating the surface level of liquid in a container, comprising a pair of spaced parallel metal wires arranged under tension to extend within the container between the highest and lowest levels to be indicated, a float of substantially cylindrical form encircled by said wires so as to roll along the same when moved due to change of liquid level in the container and a resistor disposed along the path of travel of said float so as to be engaged by said float as the latter rises or falls.

2. An apparatus for indicating the surface level of liquids in a container, comprising at least one flexible guide member arranged to extend within the container between the highest and lowest levels to be indicated, a float having the form of a solid of revolution, with at least part of its surface of conductive material, and encircled by said flexible guide member so as to roll along the same when moved due to change of liquid level in the container and a resistor disposed along the path of travel of said float so as to be engaged by a conductive part of the surface of said float as the latter rises or falls.

3. An apparatus for indicating the surface level of liquid in a container, comprising a pair of spaced parallel metal wires arranged under tension to extend within the container between the highest and lowest levels to be indicated, a float of substantially cylindrical form with part of its surface covered by two areas of conductive material, extending around the float but insulated from each other, said float being encircled by said wires so as to roll along the same when moved due to change of liquid level in the container and a pair of coiled wire resistors disposed along the path of travel of said float so as to be engaged respectively by the two conductive areas on said float as the latter rises or falls.

4. An apparatus for indicating the surface level of liquids in a container, comprising at least one flexible guide member arranged to extend within the container between the highest and lowest levels to be indicated, a float having the form of a solid of revolution and encircled by said flexible guide member so as to roll along the same when moved due to change of liquid level in the container and a resistor disposed along the path of travel of said float so as to be engaged by said float as the latter rises or falls, said resistor comprising a rod curved along its length so as to maintain a suitable contact pressure between the float and the resistor throughout the range of travel of said float, and a resistance wire wound on said rod.

5. An apparatus for indicating the surface level of liquid in a container, comprising a pair of spaced parallel metal wires arranged under tension to extend within the container between the highest and lowest levels to be indicated, a float of substantially cylindrical form encircled by said wires so as to roll along the same when moved due to change of liquid level in the container and a resistor disposed along the path of travel of said float so as to be engaged by said float as the latter rises or falls, said resistor comprising a rod curved along its length so as to maintain a suitable contact pressure between the float and the resistor throughout the range of travel of said float, and a resistance wire wound on said rod.

WILLIAM THOMAS MARCHMENT.

REFERENCES CITED

The following references are of record in the file of this patent:

UNITED STATES PATENTS

| Number | Name | Date |
| --- | --- | --- |
| 1,081,843 | Larson | Dec. 16, 1913 |
| 1,231,964 | Suchanek | July 3, 1917 |
| 2,289,202 | McCoy | July 7, 1942 |
| 1,189,869 | Remy et al. | July 4, 1916 |
| 1,856,364 | Watson | May 3, 1932 |
| 2,298,893 | Macintyre | Oct. 13, 1942 |
| 2,333,406 | Ballard | Nov. 2, 1943 |

FOREIGN PATENTS

| Number | Country | Date |
| --- | --- | --- |
| 173,071 | British | Dec. 23, 1921 |
| 435,455 | British | Sept. 16, 1935 |
| 474,766 | British | Nov. 8, 1937 |
| 600,546 | French | Nov. 10, 1935 |
| 681,642 | French | Feb. 3, 1930 |